Patented Nov. 28, 1950

2,531,410

UNITED STATES PATENT OFFICE 2,531,410

POLYMERIC COMPOSITIONS

Gaetano F. D'Alelio, Shaker Heights, Ohio, assignor to Industrial Rayon Corporation, Cleveland, Ohio, a corporation of Delaware No Drawing. Application December 13, 1946,
Serial No. 716,170

9 Claims. (Cl. 260—78.5)

This invention relates to copolymers of acrylonitrile and itaconamide. More particularly this invention is concerned with molecularly oriented formed structures comprising the cold drawn polymerization product of a polymerizable mass comprising acrylonitrile and itaconamide in the presence or absence of other monoethylenic copolymerizable compounds. This invention also deals with compositions of these copolymers adapted to the formation of shaped articles and with processes for the conversion of these compositions to molecularly oriented fibers, threads, bristles, monofilaments, hereinafter referred to as "fibers," and other shaped articles, such as films and the like.

Generally, it has been known for some time that certain copolymers of acrylonitrile may be adapted to the preparation of shaped articles, such as films, fibers, foils, tubes, etc. However, only some of these copolymers have been regarded as capable of being cold drawn to produce structures molecularly oriented along the fiber axis. Cold drawing may be defined as the stretching of a polymeric material at a temperature below the melting point of the material to give a molecularly oriented structure.

In general, copolymers of acrylonitrile having high percentages of acrylonitrile in the polymer molecules, e. g. about 85 percent or more, have been regarded as desirable for the preparation of molecularly oriented structures. For some time the use of these copolymers was limited by the lack of information on suitable solvents. Recently however, more appropriate solvents, such as N,N-dimethyl acetamide, have been suggested for use in preparing compositions of copolymers containing at least about 85 percent acrylonitrile in the polymer molecule.

The use of effective solvents has made possible the preparation of molecularly oriented structures from certain copolymers containing at least about 85 percent acrylonitrile. Heretofore it has been believed that such copolymers may be more readily adapted to the preparation of molecularly oriented structures than either an unmodified polyacrylonitrile or a copolymer of acrylonitrile containing less than about 85 percent acrylonitrile.

It has now been found possible to prepare molecularly oriented shaped articles exhibiting characteristic X-ray diffraction patterns from cold drawn copolymers of acrylonitrile and itaconamide. Such articles may be produced in accordance with this invention by dissolving the copolymer in a suitable solvent, coagulating the desired polymer into the shaped article and thereafter subjecting the article to such further treatment, e. g., cold drawing, heat treating, etc., as may be necessary to give the article the desired properties.

The term "itaconamide" is used in this specification in its ordinary sense in that it is restricted to itacondiamide and is not intended to include any monoamides.

The polymer molecules of the acrylonitrile-itaconamide copolymers of this invention should contain at least about 29 percent by weight of acrylonitrile, at least about 1 percent itaconamide and the percent of other copolymerizable compounds may vary generally from 0 to 15, the sum of the polymerized components equaling 100 percent.

Acrylonitrile has the formula CH$_2$=CH—CN and when polymerized a polymer is obtained having the repeating unit

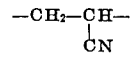

The nitrile grouping (—CN) has strong secondary bonding forces and may cause crystallization along a polymer chain. Such crystallizing groups favor more permanent molecular orientation of a polymer upon cold drawing. In polyacrylonitrile, the periodicity of the repeating nitrile group is exceptionally high since there is one nitrile group for each two carbon atoms in the linear chain.

When acrylonitrile is copolymerized with certain vinyl or vinylidene monomers, e. g. the acrylic esters, the itaconic esters, the vinyl ethers, the resulting copolymers are more soluble and have less tendency to retain molecular orientation. This increased solubility indicates lateral disorder along the polymer chain. There is also a loss in bonding strength which may be responsible for the relaxation of cold drawn structures as is generally evident when less than about 85 percent of acrylonitrile is combined in these copolymers.

It has now been found that, if the monomers which are copolymerized with acrylonitrile have groups with high bonding strengths, the useful range of acrylonitrile copolymers is greatly extended, and that copolymers of acrylonitrile containing less than about 85 percent acrylonitrile may also be used in the production of satisfactory cold drawn oriented compositions. It is extremely surprising that itaconamide is exceptionally effective in this respect.

Itaconamide has the formula

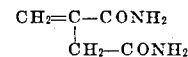

and if polymerized its polymers should have the repeating unit

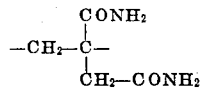

According to the present state of knowledge it has not been possible to polymerize itaconamide by itself to give satisfactory high molecular weight polymers. However, it may be satisfactorily copolymerized in some cases with other polymerizable materials such as acrylonitrile. This reluctance of itaconamide to form high polymers by itself is also evidenced somewhat by the fact that, up to the present time, it has not been possible to prepare simple copolymers of itaconamide and acrylonitrile containing in the polymer molecule a higher molecular ratio than 1 to 1 of itaconamide to acrylonitrile, which is equivalent to about 71 percent by weight itaconamide and 29 percent acrylonitrile.

These copolymers of acrylonitrile and itaconamide have polymer molecules containing repeating units of the following formulas

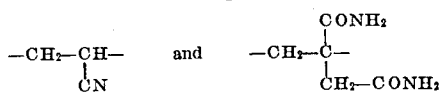

Tripolymers and other copolymers of acrylonitrile and itaconamide which contain additional copolymerizable compounds in the polymer molecule will also have other repeating units. These units will correspond to the units derived from polymerization or copolymerization of these third components or mixtures of components, such as from fumaronitrile, methyl beta-cyanoacrylate, beta-cyanoacrylamide, acrylic acid, methacrylic acid, methacrylonitrile, vinyl chloride, vinylidene chloride, vinyl chloracetate, styrene, monochlorostyrene, dichlorostyrene and itaconic acid.

This invention will be more fully described by the following examples, although it is understood that the invention is not intended to be limited by these examples. These examples illustrate the use of itaconamide to enhance the physical and chemical properties of acrylonitrile polymers. In these examples "parts" of materials is intended to means parts by weight.

Example I

A copolymer was prepared polymerizing a mixture of 80 parts acrylonitrile and 20 parts itaconamide under the following conditions: The mixed monomers were slowly added over a period of less than an hour to 750–1000 parts of distilled water at 30–50° C. containing dissolved therein 0.6 to 1 part ammonium persulfate and 0.6 to 1.5 parts of sodium bisulfite. The reaction was continued for 1–3 hours, at which time a yield of over 85 percent solid copolymer was precipitated. The molecular weight of this copolymer was found to be over 10,000. The resulting polymer showed no melting or softening point, and is insoluble in acetone, dioxane, nitromethane, ethyl acetate, methyl alcohol, butyl acetate, cyclohexanone, etc. It is soluble, however, in N,N-dimethyl acetamide and such a solution may be used in casting films and spinning fibers as indicated in Example II.

A series of copolymers having molecular weights of at least about 10,000 may be made similarly from various mixtures of acrylonitrile and itaconamide, which copolymers contain about 29 or more percent by weight of acrylonitrile and about 1 or more percent of itaconamide in the polymer molecule. By such copolymerization the highest combined ratio of the monomers may be one molecule of itaconamide per molecule of acrylonitrile, in which case the weight ratio is 71 parts itaconamide to 29 parts acrylonitrile in the polymer molecules. The polymers in this series show no melting or softening point and all are insoluble in acetone, dioxane, nitromethane, ethyl acetate, methyl alcohol, butyl acetate, cyclohexanone, etc.

Example II

The following data illustrates the effective use of itaconamide in modifying acrylonitrile polymers to produce molecularly oriented compositions with enhanced physical and chemical properties. Films were cast from (a) a N,N-dimethyl acetamide solution of polyacrylonitrile, and (b) a N,N-dimethyl acetamide solution of the copolymer described in Example I, as obtained from the mixture of 80 parts acrylonitrile and 20 parts itaconamide. Both polymers had been prepared under identical conditions. The films were dried to eliminate substantially all of the dimethyl acetamide solvent and thereafter cold drawn about 600 percent at 150–160° C. The cold drawn films were heat treated at substantially constant length for 1 hour at 150° C. These heat treated films were then subjected to shrinkage tests in boiling water. The polyacrylonitrile film and the copolymer film were both found to shrink 3 percent. These results show that the copolymer film had sacrificed no resistance to shrinkage by the incorporation of itaconamide. The copolymer has benefited, however, by improvements in dyeing and solubility properties. The cold drawn and heat treated copolymer film also exhibited birefringence under Nicol prisms.

Fibers may be spun from these same solutions of (a) and (b) which show the same characteristics in resistance to shrinkage, whereas the copolymer fibers have acquired improvements in dyeing and solubility characteristics.

Example III

A tripolymer containing in the polymer molecule 95 percent acrylonitrile, 2 percent itaconamide and 3 percent methacrylonitrile may be prepared by the procedure in Example I. This tripolymer may be dissolved in N,N-dimethyl acetamide and a film cast from the resulting composition. As in Example II the tripolymer films and fibers when dried, cold drawn about 600 percent at 150–160° C., heat treated at substantially constant length for 1 hour at 150° C., and then subjected to shrinkage tests in boiling water show the same characteristics as in Example II.

Although acrylonitrile and itaconamide may be copolymerized in a molecular ratio of 1 to 1, thereby combining in the polymer molecule about 71 percent by weight itaconamide and about 29 percent acrylonitrile, there is no particular advantage obtained by having more than about 25 percent itaconamide. Polymeric compositions containing about 1 to 25 percent itaconamide and about 99 to 75 percent acrylonitrile are particularly advantageous in the preparation of molecularly oriented structures having improvide solubility and dyeing characteristics. When compounds of high bonding strength, such as fumaronitrile, beta-cyanoacrylamide and methyl beta-cyanoacrylate, are used as third components, the acrylonitrile content in the polymer molecule may advantageously be below 75 percent.

The use of itaconamide in the practice of this invention also permits wide modification of the basic acrylonitrile copolymers with third compounds. Thus in copolymers containing about 80 percent acrylonitrile, a copolymer may have the following composition: about 80 percent acrylonitrile, about 5 percent itaconamide and about 15 percent of other copolymerizable compounds. Also, in a copolymer containing about 85 percent or more of acrylonitrile, the range of composition may be about 85–99 percent for acrylonitrile, about 1–15 percent for itaconamide and about 0–14 percent for other copolymerizable compounds.

In general, copolymers of acrylonitrile, itaconamide and other copolymerizable monoethylenic compounds may have a percent range of other copolymerizable monoethylenic compounds in the polymer molecule up to about 15 percent. The amount of other copolymerizable compounds which is permissible without serious detraction from the molecular orientation properties obtained by this invention depends on the bonding properties exhibited by the groups in these compounds. For example, larger percentages are permissible for compounds containing groups of high bonding strengths as compared to low percentages permissible for compounds having groups of low bonding strengths. It may be possible, in some cases, therefore, to use amounts of compounds having high bonding strength, such as methacrylonitrile, methyl beta-cyanoacrylate, beta-cyanoacrylamide, fumaronitrile, etc., exceeding the amount represented by the above formula. However, when these copolymerizable compounds have low bonding strengths the amounts are preferably within the range of this formula.

When the third component in an acrylonitrile-itaconamide tripolymer is one likely to exert small or no bonding forces, the amount of such component used to replace acrylonitrile in a polymerization composition must necessarily be smaller than in cases where the third component contributes greater bonding forces. Generally it is advantageous that the sum of the amounts of acrylonitrile and itaconamide in the polymer molecule total about 85 percent. For example, a tripolymer of this invention may contain in the polymer molecule, about 75 percent by weight acrylonitrile, about 10 percent itaconamide and about 15 percent of a third copolymerizable compound. This is not intended to imply that the only purpose of the itaconamide is to supply equivalent numbers of cyano groups since other benefits, such as improvements in solubility and dyeing properties, are derived than would be obtainable by the equivalent amount of acrylonitrile.

In the case of tripolymers containing about 80 percent acrylonitrile, about 1 percent itaconamide may be sufficient. Where the third compound contributes little or no bonding forces and about 1 percent itaconamide is used, it may be advantageous to increase the content of acrylonitrile to about 90 percent, and particular advantages may often be obtained with about 95 percent acrylonitrile. The character of the third compound is important in determining the amount of acrylonitrile to be used as the base compound, the amount of itaconamide to be added as a modifier and the amount of third compound to give the desired special properties. For example, tripolymers having desirable properties may be made containing in the polymer molecule at least about 80 percent acrylonitrile, at least about 1 percent itaconamide and about 5 percent itaconic acid. Another useful composition for a tripolymer comprises about 25 percent vinyl chloride with at least about 65 percent acrylonitrile and at least about 1 percent itaconamide.

The third monomer or mixture of monomers may be selected from a large number of polymerizable monoethylenic compounds, for example, acrylic acid, methacrylic acid, methacrylonitrile, vinyl chloride, vinylidene chloride, vinyl chloroacetate, styrene, monochlorostyrene, dichlorostyrene, beta-cyanoacrylamide, fumaronitrile, itaconic acid, methyl beta-cyanoacrylate, etc. For economic reasons, it is advantageous to use copolymers containing at least about 85 or more percent acrylonitrile. Examples of a number of suitable tripolymers comprising acrylonitrile, itaconamide and a third monomer are given below in percents by weight.

| Acrylonitrile | Itaconamide | Third Monomer |
|---|---|---|
| 90 | 5 | 5 Methacrylonitrile |
| 95 | 2 | 3 Itaconic acid |
| 90 | 5 | 5 Itaconic acid |
| 80 | 2 | 18 Vinyl chloride |
| 75 | 5 | 20 Vinylidene chloride |
| 80 | 5 | 15 Methyl beta-cyanoacrylate |
| 70 | 5 | 25 beta-Cyanoacrylamide |
| 65 | 5 | 30 Fumaronitrile |
| 93 | 5 | 2 Acrylic acid |
| 92 | 5 | 3 Methacrylic acid |
| 95 | 2 | 3 Vinyl chloroacetate |
| 90 | 5 | 5 Styrene |
| 85 | 5 | 10 Monochlorostyrene |
| 80 | 5 | 15 Dichlorostyrene |

The copolymers of this invention may be prepared by any suitable method, for example, by mass polymerization, emulsion polymerization, etc. It may be advantageous to add various ingredients to the polymerizable mass such as catalysts, emulsifying agents, solvents, etc. Various materials may be also incorporated in the copolymers. For example, plasticizers, lubricants, pigments, etc. may be added either to the polymerizable mass or the copolymers to give special properties to the resultant product.

For use in the preparation of shaped articles, the copolymers of this invention have molecular weights preferably of at least about 10,000. However, copolymers of molecular weights less than 10,000 may be used for other purposes, such as impregnants, solvent resistant coatings, etc. The molecular weight of the copolymers is dependent on the concentrations of monomers, the amount and type of catalyst, the temperature of reaction, etc.

As is quite generally known in the field of high polymers, molecular orientation is usually indicated and identified by birefringence of polarized light, as under Nicol prisms, by increased density as compared to the density of the same polymer unoriented, and by characteristic X-ray diffraction patterns. When a material is crystalline or oriented, its X-ray diagram shows bright areas or spots for points of crystallization and dark areas for the non-crystalline regions. The intensity or number of these bright spots increases with the degree of orientation or crystallization. Amorphous or non-crystalline materials give X-ray diagrams having very few high lights or bright spots whereas crystalline or oriented materials give definite X-ray diffraction patterns. In these patterns there are definite relationships of the bright spots with regard to position and spacing which are generally characteristic of the composition of the material being X-rayed. In fibers or films the orientation usually follows the direction of drawing or stretching so that the orientation is parallel to the fiber axis or a major surface.

Instead of using N,N-dimethyl acetamide as a solvent in the practice of this invention, N,N-dimethyl formamide or a number of other solvents may be used, alone or in conjunction with N,N-dimethyl cyanamide; N,N-dimethyl cyanoacetamide; N,N-dimethyl methoxyacetamide; methylene dinitrile; methylene di-thiocyanate; formylcaprolactam,

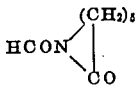

formyl morpholine

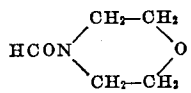

tetramethylene sulfone, etc.

Useful fibers may be made from the solutions of the copolymers of this invention by dry spinning, as in the preparation of cellulose acetate fibers, or by wet spinning, as in the preparation of viscose rayon. In wet spinning, the solution of copolymer may be spun into a substance which is a non-solvent for the copolymer, but which is advantageously compatible with the solvent in which the polymer is dissolved. For example, water, acetone, methyl alcohol, carbon disulfide, glycerine, chloroform, carbon tetrachloride, benzene, acetone, etc., may be used as a precipitating bath for N,N-dimethyl acetamide and other solvent compositions of these copolymers. The extruded fiber from which substantially all of the solvent has been removed in the spinning step, about 1–10 percent remaining in the shaped article, may then be cold drawn about 100–600 percent, preferably 300–600 percent; and the drawn fiber heat treated usually at substantially constant length at about 150–160° C. to effect more complete crystallization and removal of the remaining solvent. The term "heat treated," as used herein, refers to the application of heat to an object usually at a controlled temperature and usually by means of the medium surrounding the object.

As discussed before, the molecularly oriented fibers and other shaped articles of this invention may be identified by their X-ray diffraction patterns which are distinct and characteristic. These shaped articles are also characterized by their low shrinkage in boiling water, which shrinkage is generally about 3 percent of the cold drawn or stretched article.

The fibers prepared by the practice of this invention are especially advantageous because of their good heat resistance, tensile strength and improved dyeing properties. Moreover, these properties make the fibers particularly desirable for use in the manufacture of hosiery and of all-purpose fabrics such as are used for blouses, shirts, suits, etc.

I claim:

1. A copolymer of acrylonitrile and itacondiamide, said copolymer containing in the polymer molecule at least about 29 percent by weight acrylonitrile and at least about 1 percent itacondiamide.

2. A copolymer of acrylonitrile and itacondiamide, said copolymer containing in the polymer molecule at least about 29 percent by weight acrylonitrile, at least about 1 percent itacondiamide, and at least about 1 percent of a monoethylenic compound of the class consisting of fumarodinitrile, beta-cyanoacrylamide, methyl beta-cyanoacrylate, acrylic acid, methacrylic acid, methacrylonitrile, vinyl chloride, vinylidene chloride, vinyl chloracetate, styrene, monochlorostyrene, dichlorostyrene, dichlorostyrene and itaconic acid, the sum of the copolymerized compounds equaling 100 percent.

3. A fiber comprising the polymerization product of a polymerizable mixture comprising acrylonitrile and itacondiamide, said polymerization product having a molecular weight of at least about 10,000 and containing in the polymer molecule at least about 29 percent by weight acrylonitrile and at least about one percent itacondiamide.

4. A fiber comprising a copolymer of acrylonitrile and itacondiamide, said copolymer having a molecular weight of at least about 10,000, and containing in the polymer molecule at least about 29 percent by weight acrylonitrile, at least about 1 percent itacondiamide and the percent of a copolymerizable monoethylenic compound of the class consisting of fumarodinitrile, methyl beta-cyanoacrylate, beta-cyanoacrylamide, acrylic acid, methacrylic acid, methacrylonitrile, vinyl chloride, vinylidene chloride, vinyl chloracetate, styrene, monochlorostyrene, dichlorostyrene and itaconic acid, contained in the polymer molecule varying up to about 15, the sum of the copolymerized compounds equaling 100 percent.

5. A cold drawn fiber having molecular orientation, said article comprising the polymerization product of a polymerizable mass comprising acrylonitrile and itacondiamide and said polymerization product having a molecular weight of at least about 10,000 and containing in the polymer molecule at least about 29 percent by weight acrylonitrile and at least about one percent itacondiamide.

6. A cold drawn fiber having molecular orientation, said fiber comprising a copolymer of acrylonitrile and itacondiamide, said copolymer having a molecular weight of at least about 10,000 and containing in the polymer molecule at least about 75 percent by weight acrylonitrile and at least about 1 percent itacondiamide, and the percent of a copolymerizable monoethylenic compound of the class consisting of fumarodinitrile, methyl beta-cyanoacrylate, beta-cyanoacrylamide, acrylic acid, methacrylic acid, methacrylonitrile, vinyl chloride, vinylidene chloride, vinyl chloracetate, styrene, monochlorostyrene, dichlorostyrene and itaconic acid, contained in the polymer molecule varying up to about 15, the sum of the copolymerized compounds equaling 100 percent.

7. A cold drawn fiber having molecular orientation, said fiber comprising a copolymer having a molecular weight of at least about 10,000 and containing in the polymer molecule at least about 90 percent acrylonitrile and at least about 1 percent itacondiamide.

8. A cold drawn fiber having molecular orientation, said fiber comprising a tripolymer having a molecular weight of at least about 10,000 and containing in the polymer molecule at least about 80 percent acrylonitrile, at least about 1 percent itacondiamide and an appreciable amount of itaconic acid, said amount being no more than 5 percent.

9. A cold drawn fiber having molecular orientation, said fiber comprising a tripolymer having a molecular weight of at least about 10,000 and containing in the polymer molecule at least about 65 percent acrylonitrile, at least about 1 percent itacondiamide, and an appreciable amount of vinyl chloride, said amount being no more than about 25 percent.

GAETANO F. D'ALELIO.

REFERENCES CITED

The following references are of record in the file of this patent:

UNITED STATES PATENTS

| Number | Name | Date |
| --- | --- | --- |
| 2,123,599 | Fikentscher | July 12, 1938 |
| 2,366,495 | D'Alelio | Jan. 2, 1945 |
| 2,404,713 | Houtz | July 23, 1946 |